United States Patent
Jampala et al.

(10) Patent No.: US 12,501,517 B2
(45) Date of Patent: Dec. 16, 2025

(54) ENABLING COMMUNICATION IN NGDU OF O-RAN

(71) Applicant: Rakuten Symphony, Inc., Tokyo (JP)

(72) Inventors: Naga Krishna Prasad Jampala, Bangalore (IN); Sukesh Thotengara, Bangalore (IN); Biswajit Panigrahi, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 377 days.

(21) Appl. No.: 18/044,261

(22) PCT Filed: Feb. 9, 2023

(86) PCT No.: PCT/US2023/062298
§ 371 (c)(1),
(2) Date: Mar. 7, 2023

(87) PCT Pub. No.: WO2024/144895
PCT Pub. Date: Jul. 4, 2024

(65) Prior Publication Data
US 2024/0224071 A1    Jul. 4, 2024

(30) Foreign Application Priority Data
Dec. 29, 2022 (IN) .............................. 202241076800

(51) Int. Cl.
*H04W 92/04* (2009.01)
*H04L 41/0226* (2022.01)
(Continued)

(52) U.S. Cl.
CPC ....... *H04W 92/045* (2013.01); *H04L 41/0226* (2013.01); *H04L 69/08* (2013.01); *H04W 76/10* (2018.02); *H04W 24/02* (2013.01)

(58) Field of Classification Search
CPC .......... H04W 76/00; H04W 76/10–12; H04W 96/02–045; H04L 41/02–0226; H04L 69/08–085
See application file for complete search history.

(56) References Cited

U.S. PATENT DOCUMENTS

| | | | |
|---|---|---|---|
| 11,233,691 B2 * | 1/2022 | Grayson | .............. H04L 65/1066 |
| 11,653,283 B2 * | 5/2023 | Goyal | ................... H04W 40/02 370/328 |

(Continued)

OTHER PUBLICATIONS

International Search Report issued Jul. 12, 2023 in Application No. PCT/US2023/062298.

(Continued)

*Primary Examiner* — Brendan Y Higa
(74) *Attorney, Agent, or Firm* — Sughrue Mion, PLLC

(57) ABSTRACT

Embodiments includes a NGDU for enabling communication in an O-RAN. The NGDU includes a RIM M-plane manager comprising a M-plane model, multiple DUs connected to the RIM M-plane manager and communicating with the RIM M-plane manager over a NETCONF interface and multiple RUs connected to the RIM M-plane manager and communicating with the RIM M-plane manager over a non-NETCONF interface. The RIM M-plane manager receives a first communication from RU over the non-NETCONF interface; send it to OSS and receive IP associated with DU for executing M plane service. The RIM M-plane controller starts a Netconf Callhome procedure with the DU and allows it to configure CP identifier at the RIM M-Plane manager. The RIM M-plane controller determines non-NETCONF interface compatible version of the CP identifier, sends the non-NETCONF interface compatible version of the CP identifier to the RU, and enables the communication between the RU and the DU.

10 Claims, 8 Drawing Sheets

(51) Int. Cl.
*H04L 69/08* (2022.01)
*H04W 76/10* (2018.01)
*H04W 24/02* (2009.01)

(56) References Cited

U.S. PATENT DOCUMENTS

| | | | |
|---|---|---|---|
| 11,917,039 B2* | 2/2024 | Al-Mufti | H04L 69/08 |
| 2012/0214477 A1* | 8/2012 | Wieslawa | H04W 4/18 |
| | | | 455/507 |
| 2021/0120104 A1* | 4/2021 | Al-Mufti | H04L 69/321 |
| 2021/0314211 A1* | 10/2021 | Grayson | H04L 41/0213 |
| 2022/0286910 A1* | 9/2022 | Ramakrishnan | H04W 48/08 |
| 2022/0345896 A1* | 10/2022 | Ahmed | H04W 24/02 |
| 2023/0144337 A1* | 5/2023 | Kumar | H04W 24/02 |
| | | | 455/423 |
| 2023/0164756 A1* | 5/2023 | Vankayala | H04W 72/121 |
| | | | 370/329 |
| 2024/0195543 A1* | 6/2024 | Bhaskaran | H04L 5/0048 |
| 2024/0388967 A1* | 11/2024 | Grayson | H04L 41/0806 |

OTHER PUBLICATIONS

Written Opinion of the International Search Authority issued Jul. 12, 2023 in Application No. PCT/US2023/062298.

* cited by examiner

ENABLING COMMUNICATION IN NGDU OF O-RAN

CROSS REFERENCE TO RELATED APPLICATIONS

The present application claims priority to and is the 35 U.S.C. § 371 United States National Phase application based on International Patent Application No. PCT/US23/62298, filed Feb. 9, 2023, and entitled "ENABLING COMMUNICATION IN NGDU OF O-RAN" which claims priority to Indian Patent Appl. No. 202241076800 entitled "Enabling Communication in NGDU of O-RAN" filed Dec. 29, 2022, which are hereby incorporated by reference in their entireties.

FIELD OF INVENTION

The present disclosure relates to Open-radio access network (O-RAN), and more specifically related to a method and a Next generation distributed unit (NGDU) for enabling communication in an Open Radio Access Network (O-RAN).

BACKGROUND

In general, Open-radio access network (O-RAN) standard-based packet networking fronthaul interfaces between a distributed unit (DU) and a radio unit (RU) for 4G and new radio (NR) 5G radio access technologies (RAT) are widely being deployed. The main cause for the growth in the deployment of the Open-RAN is because the O-RAN standard provides interoperability and standardization of RAN components, primarily the DU and the RU by including a unified interconnection standard over packet-based transport interfaces like evolved Common Public Radio Interface (eCPRI) and Radio over Ethernet (RoE). As a result, seamless integration of hardware and open-source software elements from different vendors for DUs and RUs are provided.

The RU that supports both long-term evolution (LTE) carrier and NR carrier will be shared between $5^{th}$ generation distributed unit (5G DU) and 4G LTE DU. Next generation distributed unit (NGDU) is an entity that interconnects the RU which operates on CPRI IO MPLANE front haul interface with the DUs that operates on the O-RAN front haul interface. Both the LTE DUs and the NR DUs support the O-RAN enabled front haul interface.

Conventionally, the O-RAN components use Network Configuration Protocol (NETCONF) interface to configure and manage various network elements in the O-RAN such as communication between the DUs and a radio interface module (RIM) manager. However, the RUs used for radiating may not be aware of the O-RAN standard and hence uses non-ORAN compliant protocol such as for example, Simple Object Access Protocol (SOAP) which is non-O-RAN standard compliant interface to communicate with the RIM manager. As a result, there is a mismatch in the protocols and there is no common interface used for the communication between the RIM manager and each of the DUs and the RUs. Thus, it is desired to address the above issues.

OBJECT OF INVENTION

The principal object of the embodiments herein is to provide method and a Next generation distributed unit (NGDU) for enabling communication in an Open Radio Access Network (O-RAN). The proposed method allows a seamless communication between multiple RUs connected to the NGDU over a non-Network Configuration Protocol (non-NETCONF) interface and multiple DUs connected to the NGDU over a Network Configuration Protocol (NETCONF) interface in a front-haul network. Therefore, the proposed method allows a RU with proprietary interface to communicate with the DU.

SUMMARY

Accordingly, embodiments herein disclose a Next Generation Distributed Unit (NGDU) for enabling communication in an Open Radio Access Network (O-RAN). The NGDU includes a RIM M-plane manager comprising a M-plane model, a plurality of DUs connected to the RIM M-plane manager and communicating with the RIM M-plane manager over a Network Configuration Protocol (NETCONF) interface; and a plurality of RUs connected to the RIM M-plane manager and communicating with the RIM M-plane manager over a non-Network Configuration Protocol (NETCONF) interface. The RIM M-plane manager includes a memory, a processor, a communicator and a RIM M-plane controller. The RIM M-plane controller is configured to receive a first communication from at least one radio unit (RU) of the plurality of RUs over the non-NETCONF interface in a front-haul network; send the first communication from the at least one RU to operations support systems (OSS) and receive an internet protocol (IP) associated with at least one DU for executing at least one M plane service, from the OSS. The OSS receives the IP associated with the at least one DU from one of an orchestrator and operator input and the first communication comprises a serial number associated with the at least one RU. The RIM M-plane controller is configured to start a Netconf Callhome procedure with the at least one DU and allow the at least one DU to configure a control plane (CP) identifier at the RIM M-Plane manager. The RIM M-plane controller is configured to determine a non-NETCONF interface compatible version of the CP identifier configured by the at least one DU at the RIM M-Plane manager, send the non-NETCONF interface compatible version of the CP identifier to the at least one RU, and enable the communication between the at least one RU and the at least one DU.

In an embodiment, the RIM M-plane controller is configured to determine the non-NETCONF interface compatible version of the CP identifier configured by the at least one DU at the RIM M-Plane manager includes input the CP identifier configured by the at least one DU at the RIM M-Plane manager to the M-plane model; translate the CP identifier configured by the at least one DU at the RIM M-Plane manager by the M-plane model; and determine the non-NETCONF interface compatible version of the CP identifier.

In an embodiment, the RIM M-plane controller is further configured to read the IP associated with the at least one DU, establish the at least one M plane service for each of the at least one RU over the IP associated with the at least one DU and perform handshakes between the at least one DU and the at least one RU. The RIM M-plane controller is also configured to receive at least one message from the at least one DU over the NETCONF interface, to be sent to the at least one RU; determine a non-NETCONF interface compatible version of the at least one message; and send the non-NETCONF interface compatible version of the at least one message to the at least one RU on the non-NETCONF interface.

In an embodiment, the RIM M-plane manager is configured with OSS proxy IP as day-0 parameter and wherein the control plane (CP) identifier is an extended Antenna-Carrier (eAxC) identifier comprising carrier identifier (ID) associated with the at least one RU and information indicating a type of DU of the at least one DU In an embodiment, the RIM M-plane controller is further configured to maintain heart beat mechanism towards the at least one RU and the at least one DU and periodically collect at least one of RU statistics and RU logs based on the CP identifier configured by the at least one DU. The RIM M-plane controller is configured to determine an ORAN format compatible version of the collect RU statistics and send the ORAN format compatible version of the collect RU statistics to the at least one DU and the RU logs to a server.

Accordingly, embodiments herein disclose a method for enabling communication in a Next generation distributed unit (NGDU) of an Open Radio Access Network (O-RAN). The method includes receiving, by the RIM M-plane manager, a first communication from at least one radio unit (RU) of the plurality of RUs over the non-NETCONF interface in a front-haul network and sending, by the RIM M-plane manager, the first communication from the at least one RU to operations support systems (OSS). The first communication comprises a serial number associated with the at least one RU. The method includes receiving, by the RIM M-plane manager, an internet protocol (IP) associated with at least one DU for executing at least one M plane service, from the OSS, wherein the OSS receives the IP associated with the at least one DU from one of an orchestrator and operator input and starting, by the RIM M-plane manager, a Netconf Callhome procedure with the at least one DU. The method also includes allowing, by the RIM M-plane manager, the at least one DU to configure a control plane (CP) identifier at the RIM M-Plane manager and determining, by the RIM M-plane manager, a non-NETCONF interface compatible version of the CP identifier configured by the at least one DU at the RIM M-Plane manager. The method also includes sending, by the RIM M-plane manager, the non-NETCONF interface compatible version of the CP identifier to the at least one RU, and enabling, by the RIM M-plane manager, the communication between the at least one RU and the at least one DU.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
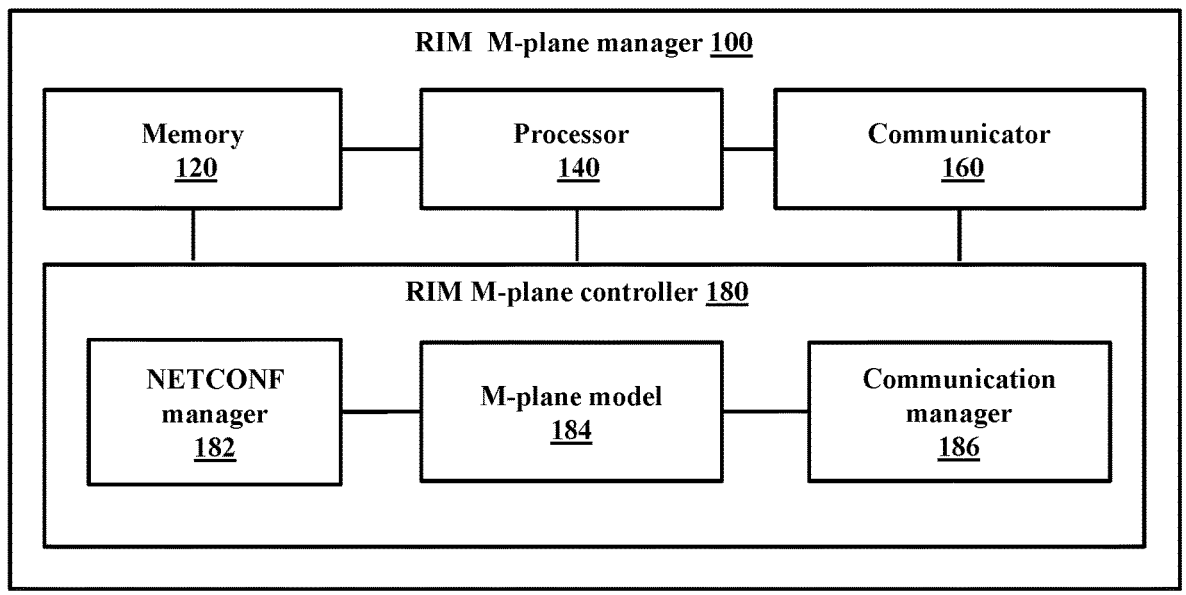
FIG. 1 illustrates a block diagram of a RIM M-plane manager of Next Generation Distributed Unit (NGDU) for enabling communication in an Open Radio Access Network (O-RAN), according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (for example but not limited to one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a Next Generation Distributed Unit (NGDU) for enabling communication in an Open Radio Access Network (O-RAN). The NGDU includes a RIM M-plane manager comprising a M-plane model, a plurality of DUs connected to the RIM M-plane manager and communicating with the RIM M-plane manager over a Network Configuration Protocol (NETCONF) interface; and a plurality of RUs connected to the RIM M-plane manager and communicating with the RIM M-plane manager over a non-Network Configuration Protocol (NETCONF) interface. The RIM M-plane manager includes a memory, a processor, a communicator and a RIM M-plane controller. The RIM M-plane controller is configured to receive a first communication from at least one radio unit (RU) of the plurality of RUs over the non-NETCONF interface in a front-haul network; send the first communication from the at least one RU to operations support systems (OSS) and receive an internet protocol (IP) associated with at least one DU for executing at least one M plane service, from the OSS. The OSS receives the IP associated with the at least one DU from one of an orchestrator and operator input and the first communication comprises a serial number associated with the at least one RU. The RIM M-plane controller is configured to start a Netconf Callhome procedure with the at least one DU and allow the at least one DU to configure a control plane (CP) identifier at the RIM M-Plane manager. The RIM M-plane controller is configured to determine a non-NETCONF interface compatible version of the CP identifier configured by the at least one DU at the RIM M-Plane manager, send the non-NETCONF interface compatible version of the CP identifier to the at least one RU, and enable the communication between the at least one RU and the at least one DU.

Accordingly, embodiments herein disclose a method for enabling communication in a Next generation distributed unit (NGDU) of an Open Radio Access Network (O-RAN). The method includes receiving, by the RIM M-plane manager, a first communication from at least one radio unit (RU) of the plurality of RUs over the non-NETCONF interface in a front-haul network and sending, by the RIM M-plane manager, the first communication from the at least one RU to operations support systems (OSS). The first communication comprises a serial number associated with the at least one RU. The method includes receiving, by the RIM M-plane manager, an internet protocol (IP) associated with at least one DU for executing at least one M plane service, from the OSS, wherein the OSS receives the IP associated with the at least one DU from one of an orchestrator and operator input and starting, by the RIM M-plane manager, a Netconf Callhome procedure with the at least one DU. The method also includes allowing, by the RIM M-plane manager, the at least one DU to configure a control plane (CP) identifier at the RIM M-Plane manager and determining, by the RIM M-plane manager, a non-NETCONF interface compatible version of the CP identifier configured by the at least one DU at the RIM M-Plane manager. The method also includes sending, by the RIM M-plane manager, the non-NETCONF interface compatible version of the CP identifier to the at least one RU, and enabling, by the RIM M-plane manager, the communication between the at least one RU and the at least one DU.

In the conventional methods and systems, the DU communicated with a RIM manager and the RIM manager passed the data as SOAP messages over SOAP interface to communicate with respective radios.

Unlike to the conventional methods and systems, in the proposed method including the O-RAN system the M-plane layer is available which understands information associated with the DUs i.e., XML data which is sent over Netconf session by using M-plane services which creates the Netconf sessions with the DU.

Unlike to the conventional methods and systems, in the proposed method a non-ORAN complaint radio can be deployed and effectively used without any change in the existing architecture, no extra deployment cost. The proposed method uses M-plane functionality over RIM to enable communication between multiple RUs and the DUs of the NGDU.

Unlike to the conventional methods and systems, the proposed method is DU independent and hence any DU of the NGDU can communicate with any RU connected to multiple ports of the NGDU.

Referring now to the drawings, and more particularly to FIGS. 1 through 6, where similar reference characters denote corresponding features consistently throughout the figures, there are shown preferred embodiments.

FIG. 1 illustrates a block diagram of a RIM M-plane manager (100) of Next Generation Distributed Unit (NGDU) (1000) for enabling communication in an Open Radio Access Network (O-RAN), according to an embodiment as disclosed herein.

O-RAN specifications permit interoperability of RAN components, for example but not limited to O-RAN specification compliant radios (or O-RAN radio units or O-RAN radios) and an O-RAN specification compliant distributed units (or O-RAN distributed units), made by different vendors. The O-RAN distributed unit may be executed on a server system, for example but not limited to local server network(s) and/or cloud computing system(s). The O-RAN distributed unit (O-DU) may comprise virtual baseband unit(s)). The O-RAN specifications utilize message protocols to communicate between remote radio units and virtual baseband units that differ from those used in legacy systems, for example but not limited to 4G specification compliant radio access networks (or 4G radio access networks). A virtual baseband unit processes, for example but not limited to encodes, baseband data received from and sent to radio(s). A radio transmits and/or receives data at one or more frequencies translated above baseband. The virtual baseband unit and radio(s) are components of a communications system such as a cellular communications system.

The messages exchanged between the radios and the NGDU or the DUs and the NGDU follow specific protocol which may include a format, i.e., a syntax with one or more variables. A message sent by the radio in any of user plane, control plane, synchronization plane, or management plane may be using the message protocol which varies based on one or more characteristics of the radio. The I/O data protocol of the radio also varies based upon one or more characteristics of the radio such as for example but not limited to compliance with a specification (for example an input/output data protocol of the radio). Radio characteristics include specification(s) with which the radio complies, radio manufacturer, radio model number, and/or radio software version.

Management Plane (M-Plane) is part of the O-RAN for configuration, monitoring, management and distribution of various services to all layers of O-RAN stack and other parts of the O-RAN. The M-plane messages are used to manage the radio unit. The M-plane provides a variety of O-RU management functions to set parameters on the O-RU side as required by the C/U-Plane and S-Plane, for example but not limited to manage O-RU software, perform fault management, etc. O-RAN fronthaul specification for the M-Plane provides various parameters as data models to FCAPS functions.

O-DU: O-RAN Distributed Unit: a logical node hosting RLC/MAC/High-PHY layers based on a lower layer functional split and O-RU: O-RAN Radio Unit: a logical node hosting Low-PHY layer and RF processing based on a lower layer functional split. This is similar to 3GPP's "TRP" or "RRH" but more specific in including the Low-PHY layer (FFT/iFFT, PRACH extraction).

In an embodiment, the RIM M-plane manager (100) includes a memory (120), a processor (140), a communicator (160) and a RIM M-plane controller (180). The RIM M-plane controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the RIM M-plane controller (180). The processor (140) is configured to execute instructions stored in the memory (120) and to perform various processes. The processor may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the RIM M-plane manager (100) and with external devices via one or more networks.

In an embodiment, the RIM M-plane controller (180) includes a NETCONF manager (182), a M-plane model (184) and a communication manager (186).

In an embodiment, the NETCONF manager (182) is configured to receive a first communication from at least one radio unit (RU) (300a) of the plurality of RUs (300a-N) over a non-NETCONF interface in a front-haul network and send the first communication from the at least one RU to an operations support systems (OSS) (400). The NETCONF manager (182) is configured to send a power ON notification received from the at least one RU (300a), to the OSS (400) via https and receive the second communication from the at least one DU (500a) through the OSS (400). The first communication received from the at least one RU (300a) is a power ON notification. First the OSS (400) receives an internet protocol (IP) associated with at least one DU (500a) from an orchestrator or as an operator input. The NETCONF manager (182) is configured to then receive the internet protocol (IP) associated with the at least one DU (500a) for executing M plane service, from the OSS (400). The NETCONF manager (182) is configured to start a Netconf Callhome procedure with the at least one DU (500a) and allow the at least one DU (500a) to configure a control plane (CP) identifier at the RIM M-Plane manager (100). The control plane (CP) identifier is an extended Antenna-Carrier (eAxC) identifier comprising carrier identifier (ID) associated with the at least one RU (300a) and information indicating a type of DU (500a) of the at least one DU (500a).

In an embodiment, the Netconf Callhome procedure is described in RFC 8071, wherein using the the Netconf Callhome procedure the NETCONF server establishes the TCP connection to the NETCONF client and then the NETCONF client starts up SSH and NETCONF as normal. Therefore, to use NETCONF Call Home, both the NETCONF server and the NETCONF client provides support for it.

The type of the DU is for example, 5G DU or 4G DU. The O-RAN fronthaul specifications prescribes the eAxC as message source and destination identifiers. The eAxC includes an O-DU port IDentifier (DU_Port_ID), Band Sector IDentifier (BandSector_ID), Component Carrier (CC)*35 IDentifier (CC_ID), and O-RU port IDentifier (RU_Port_ID). The first communication includes a serial number associated with the at least one RU (300a). The non-NETCONF interface is a non-ORAN compliant protocol interface such as for example but not limited to Simple Object Access Protocol (SOAP). The NETCONF manager (182) then sends the first communication from the at least one RU (300a) to the M-plane model (184).

In an embodiment, the M-plane model (184) is configured to receive the CP identifier configured by the at least one DU (500a) at the RIM M-Plane manager (100) to the M-plane model (184) and translate the CP identifier configured by the at least one DU (500a) at the RIM M-Plane manager (100) and determine the non-NETCONF interface compatible version of the CP identifier. Further, the M-plane model (184) is configured to receive at least one message from the at least one DU (500a) over the NETCONF interface to be sent to the at least one RU (300a) and determine a non-NETCONF interface compatible version of the at least one message. Further, the M-plane model (184) is configured to periodically collect RU statistics and RU logs based on the CP identifier configured by the at least one DU (500a), determine an ORAN format compatible version of the collect RU statistics and send the ORAN format compatible version of the collect RU statistics to the at least one DU (500a) and the RU logs to a server.

In an embodiment, the communication manager (186) is configured to enable the communication between the at least one RU (300a) and the at least one DU (500a) by configuring a carrier associated with the at least one RU (300a) based on the determined carrier ID. The RIM M-plane manager (100) is configured with IP of OSS proxy (400) as day-0 parameter.

In an embodiment, the M-plane model (184) is configured to determine an internet protocol (IP) associated with the at least one DU (500a) for executing at least one M plane service and the IP associated with the at least one DU (500*a*) is received from the OSS (400) and the OSS (400) receives the IP associated with the at least one DU (500*a*) from the orchestrator and the operator input. The M-plane model (184) is configured to read the IP associated with the at least one DU (500*a*) and establish the at least one M plane service for each of the at least one RU (300*a*) over the IP associated with the at least one DU (500*a*). For example, consider that 5G DU (500*a*) requests the RIM M-plane manager (100) for serial number in a Netconf message. Then the M-plane model (184) will translate the Netconf message to SOAP complaint message and sends the SOAP complaint message to the radio/RU requesting the RU to share the serial number.

The communication manager (186) is configured to perform handshakes between the at least one DU (500*a*) and the at least one RU (300*a*) and receive a message from the at least one DU (500*a*) over the NETCONF interface, to be sent to the at least one RU (300*a*). Further, the M-plane model (184) is configured to translate the message to a form compatible with the non-NETCONF interface and send the translated message to the at least one RU on the non-NETCONF interface.

At least one of the plurality of modules/components of the RIM M-plane controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 1 shows various hardware components of the RIM M-plane manager (100) but it is to be understood that other embodiments are not limited thereon. In other embodiments, the RIM M-plane manager (100) may include less or more number of components. Further, the labels or names of the components are used only for illustrative purpose and does not limit the scope of the invention. One or more components can be combined together to perform same or substantially similar function of the RIM M-plane manager (100).

Figure 2A:
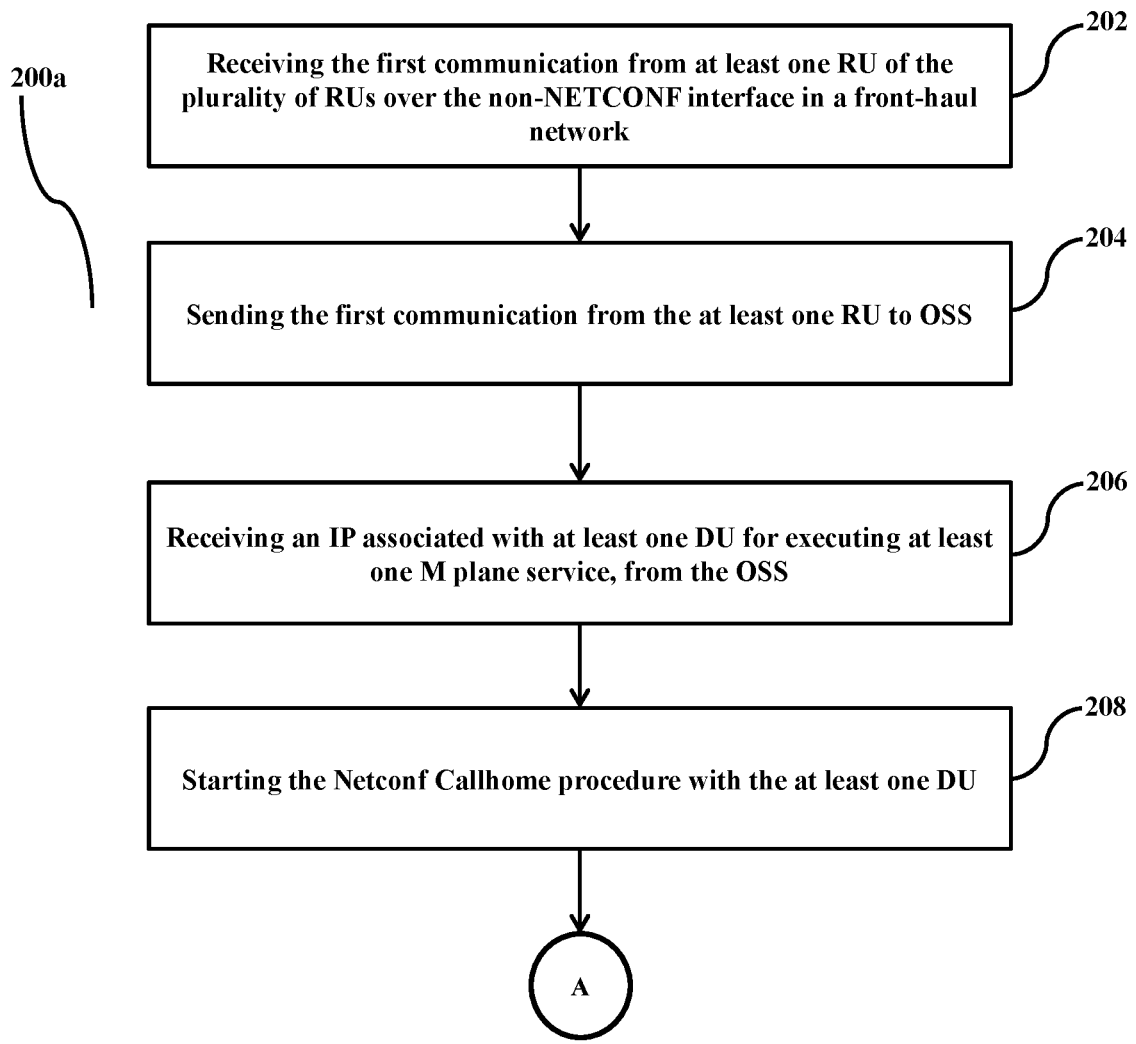
FIGS. 2A-2B is a flow diagram illustrating a method for enabling communication in the NGDU of the O-RAN, according to an embodiment as disclosed herein.
Figure 2A:
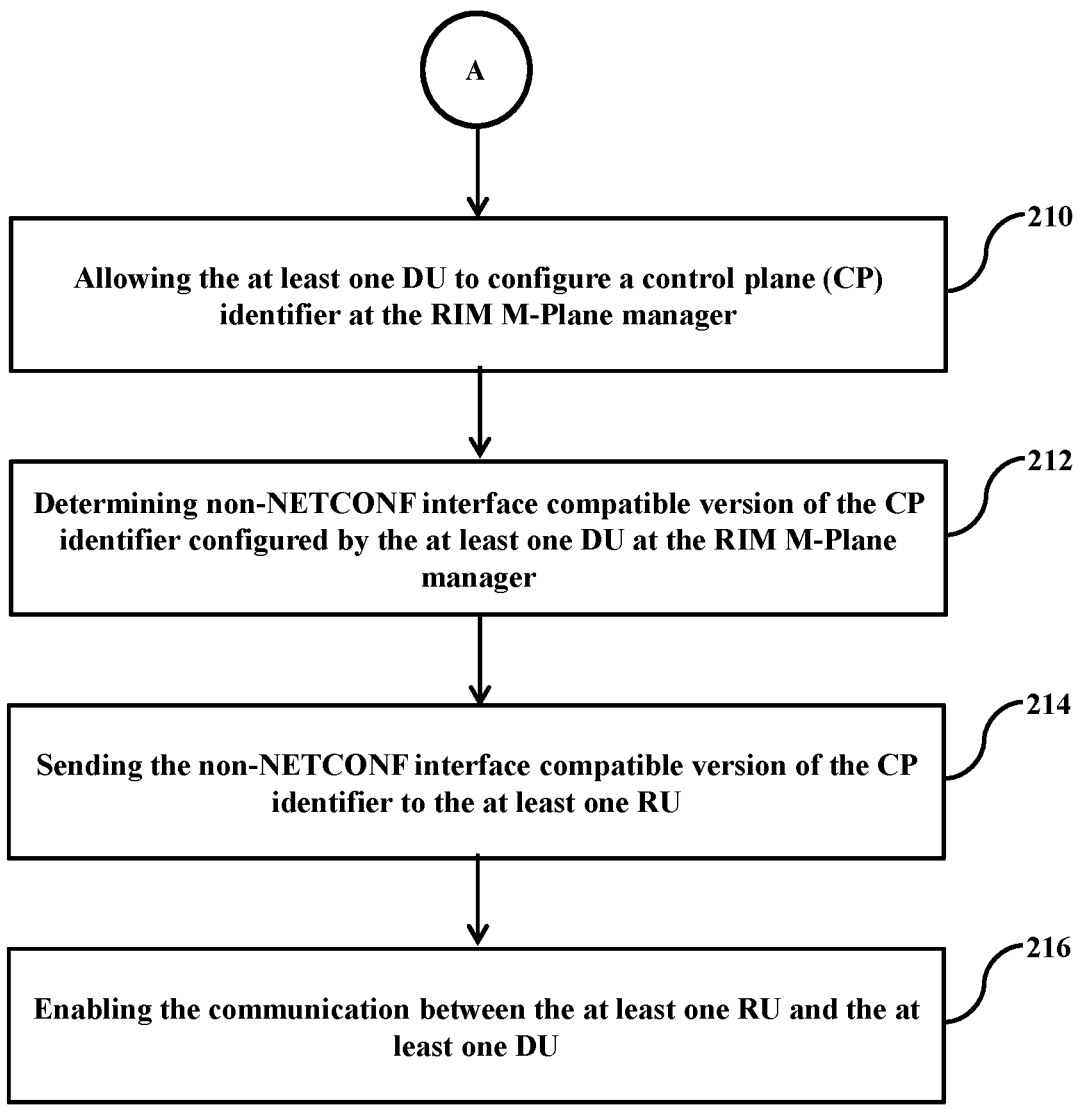
Figure 2B:
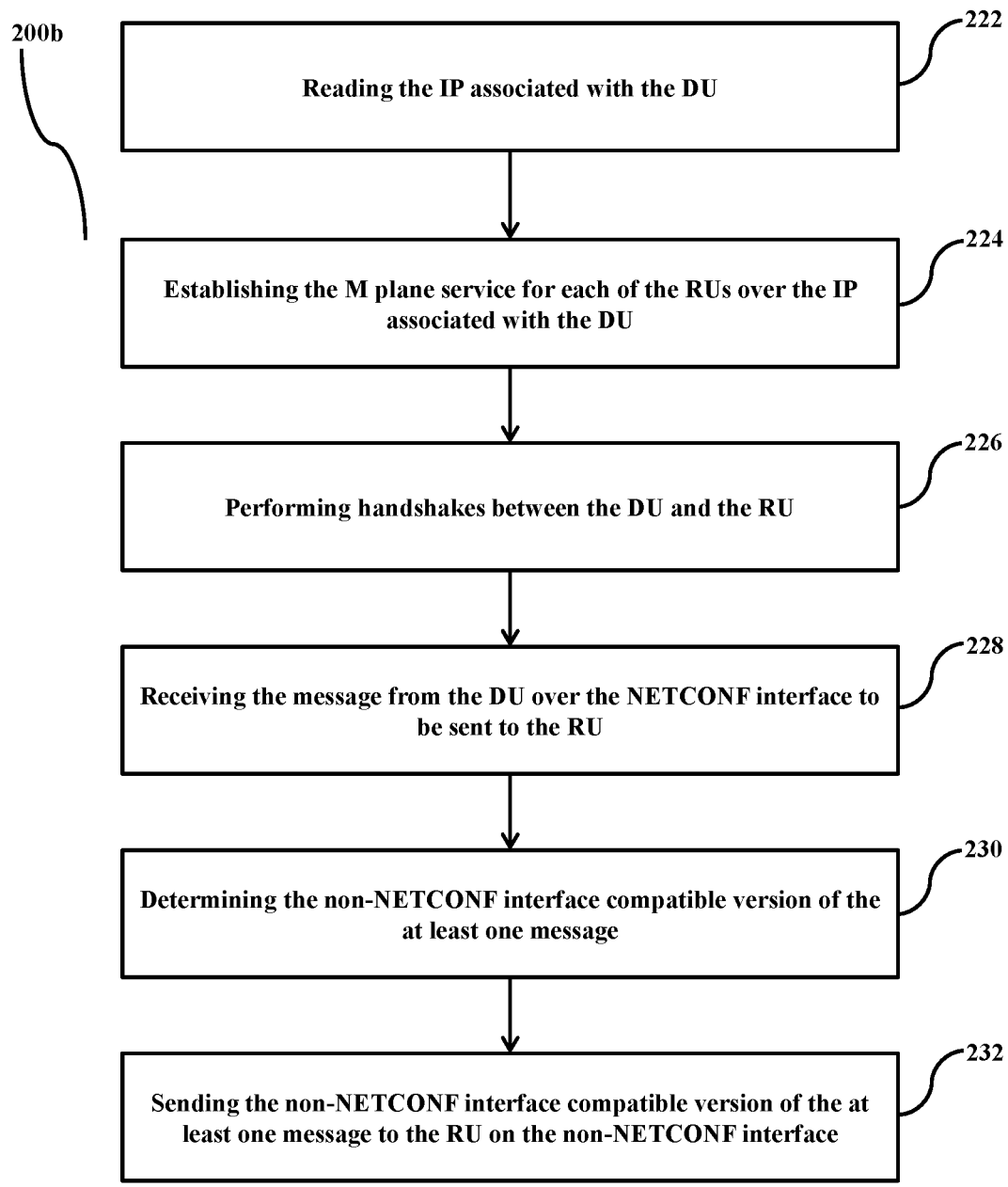

FIGS. 2A-2B are flow diagrams (200*a-b*) illustrating a method for enabling communication in the NGDU (1000) of the O-RAN, according to an embodiment as disclosed herein.

Referring to the FIG. 2A, at step 202, the method includes the RIM M-plane manager (100) receiving the first communication from the RU (300) of the plurality of RUs (300*a*-N) over the non-NETCONF interface in the front-haul network. For example, in the RIM M-plane manager (100) described in the FIG. 1, the RIM M-plane controller (180) is configured to receive the first communication from the RU (300) of the plurality of RUs (300*a*-N) over the non-NETCONF interface in the front-haul network.

At step 204, the method includes the RIM M-plane manager (100) sending the first communication from the RU (300) to the OSS (400). For example, in the RIM M-plane manager (100) described in the FIG. 1, the RIM M-plane controller (180) is configured to send the first communication from the RU (300) to the OSS (400).

At step 206, the method includes the RIM M-plane manager (100) receiving the IP associated with the DU (500) for executing the M plane service from the OSS (400), where the OSS (400) receives the IP associated with the DU (500) from the orchestrator or as the operator input. For example, in the RIM M-plane manager (100) described in the FIG. 1, the RIM M-plane controller (180) is configured to receive the IP associated with the DU (500) for executing the M plane service from the OSS (400), where the OSS (400) receives the IP associated with the DU (500) from the orchestrator or as the operator input.

At step 208, the method includes the RIM M-plane manager (100) starting the Netconf Callhome procedure with the DU (500). For example, in the RIM M-plane manager (100) described in the FIG. 1, the RIM M-plane controller (180) is configured to start the Netconf Callhome procedure with the DU (500).

At step 210, the method includes the RIM M-plane manager (100) allowing the DU (500) to configure the CP identifier at the RIM M-Plane manager (100). For example, in the RIM M-plane manager (100) described in the FIG. 1, the RIM M-plane controller (180) is configured to allow the DU (500) to configure the CP identifier at the RIM M-Plane manager (100).

At step 212, the method includes the RIM M-plane manager (100) determining the non-NETCONF interface compatible version of the CP identifier configured by the DU (500) at the RIM M-Plane manager (100). For example, in the RIM M-plane manager (100) described in the FIG. 1, the RIM M-plane controller (180) is configured to determine the non-NETCONF interface compatible version of the CP identifier configured by the DU (500) at the RIM M-Plane manager (100).

At step 214, the method includes the RIM M-plane manager (100) sending the non-NETCONF interface compatible version of the CP identifier to the RU (300). For example, in the RIM M-plane manager (100) described in the FIG. 1, the RIM M-plane controller (180) is configured to send the non-NETCONF interface compatible version of the CP identifier to the RU (300).

At step 216, the method includes the RIM M-plane manager (100) enabling the communication between the RU (300) and the DU (500). For example, in the RIM M-plane manager (100) described in the FIG. 1, the RIM M-plane controller (180) is configured to enable the communication between the RU (300) and the DU (500).

The various actions, acts, blocks, steps, or the like in the flow diagram (200*a*) may be performed in the order presented, in a different order or simultaneously. Further, in some embodiments, some of the actions, acts, blocks, steps, or the like may be omitted, added, modified, skipped, or the like without departing from the scope of the invention.

Referring to the FIG. 2B, at step 222, the method includes the RIM M-plane manager (100) reading the IP associated with the DU (500). For example, in the RIM M-plane manager (100) described in the FIG. 1, the RIM M-plane controller (180) is configured to read the IP associated with the DU (500).

At step 224, the method includes the RIM M-plane manager (100) establishing the M plane service for each of the RUs (300a-N) over the IP associated with the DU (500). For example, in the RIM M-plane manager (100) described in the FIG. 1, the RIM M-plane controller (180) is configured to establish the M plane service for each of the RUs (300a-N) over the IP associated with the DU (500).

At step 226, the method includes the RIM M-plane manager (100) performing the handshakes between the DU (500) and the RU (300). For example, in the RIM M-plane manager (100) described in the FIG. 1, the RIM M-plane controller (180) is configured to perform the handshakes between the DU (500) and the RU (300).

At step 228, the method includes the RIM M-plane manager (100) receiving the message from the DU (500) over the NETCONF interface to be sent to the RU (300). For example, in the RIM M-plane manager (100) described in the FIG. 1, the RIM M-plane controller (180) is configured to receive the message from the DU (500) over the NETCONF interface to be sent to the RU (300).

At step 230, the method includes the RIM M-plane manager (100) translating the message to the form compatible with the non-NETCONF interface. For example, in the RIM M-plane manager (100) described in the FIG. 1, the RIM M-plane controller (180) is configured to translate the message to the form compatible with the non-NETCONF interface.

At step 232, the method includes the RIM M-plane manager (100) sending the translated message to the RU (300) on the non-NETCONF interface. For example, in the RIM M-plane manager (100) described in the FIG. 1, the RIM M-plane controller (180) is configured to send the translated message to the RU (300) on the non-NETCONF interface.

The various actions, acts, blocks, steps, or the like in the flow diagram (200b) may be performed in the order presented, in a different order or simultaneously. Further, in some embodiments, some of the actions, acts, blocks, steps, or the like may be omitted, added, modified, skipped, or the like without departing from the scope of the invention.

Figure 3:
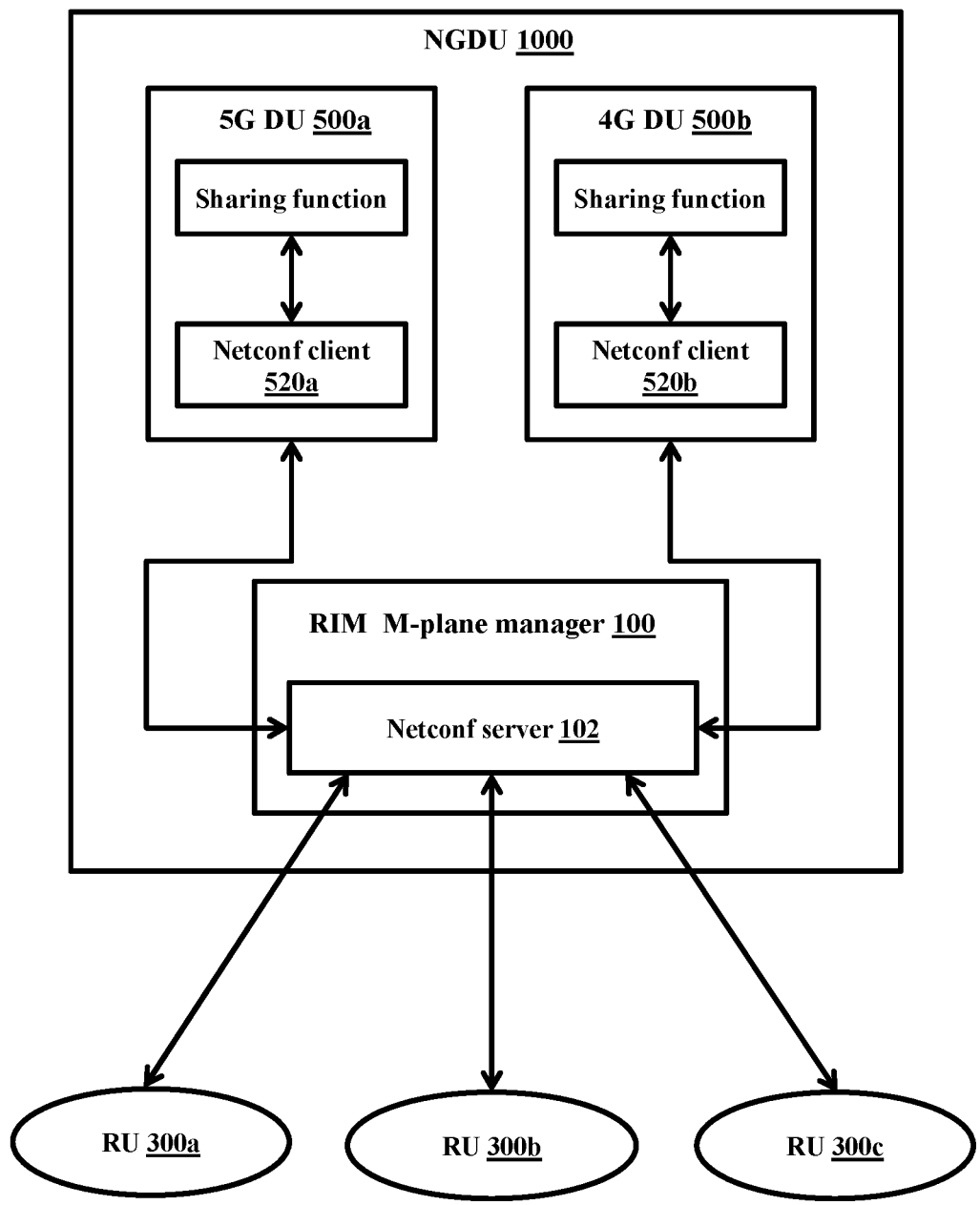
FIG. 3 illustrates a functional architecture of the NGDU for enabling communication in the NGDU of the O-RAN, according to an embodiment as disclosed herein.

FIG. 3 illustrates a functional architecture of the NGDU (1000) for enabling the communication in the NGDU (1000) of the O-RAN, according to an embodiment as disclosed herein.

Referring to the FIG. 3, consider the NGDU (1000) includes a 5G DU (500a), a 4G DU (500b) and the RIM M-plane manager (100). Generally, there are multiple RUs (300a-N) connected to the NGDU (1000) through CPRI ports. However, the DU (500a/500b) does not know which port to communicate with to be able to transact with a specific RU. However, the M-plane of the NGDU (1000) which is managed by the RIM M-plane manager (100) knows to which port the specific RU is connected/discovered and hence performs the translations to enable the communication between the DU (500a/500b) and the specific RU. The functional requirements of the RIM M-plane manager (100) includes that the RIM M-plane manager (100) should establish Netconf session with each of the 5G DU (500a) and the 4G DU (500b). The RIM M-plane manager (100) is also communicating with multiple RUs (300a-N).

For example, if there are 3 RUs (300a-c) connected to the NGDU (1000), then the RIM M-plane manager (100) should be able to establish 3 Netconf sessions with the 5G DU (500a) and 3 Netconf sessions with the 4G DU (500b). Further, the RIM M-plane manager (100) should be able to support multiple user profiles in order to support the 5G DU (500a) and the 4G DU (500b). Operations and Access should be allowed and performed based on the user access permission.

The RIM M-plane manager (100) should be able to handle TLS as transport for Netconf sessions and handle supervision notification and supervision timer for each active Netconf session individually. The RIM M-plane manager (100) should send a power on notification to the OSS (400) and fetch DU details (FQDN, HostName, Role etc). The RIM M-plane manager (100) should be able to support dynamic enabling/disabling carrier for both NR and LTE carriers and provide timing status at carrier level upon querying and by notification. The RIM M-plane manager (100) should support for delay measurement. If the RU (300) is restarted then the RIM M-plane manager (100) should terminate all Netconf sessions and trigger call-home once the RU (300) is connected back.

The below assumptions are made with respect to the RIM M-plane manager (100):

1. The RIM M-plane manager (100) identifies the type of the DU as 5G DU (500a) and the 4G DU (500b) from the OSS (400) as part of response to the power on notification. If one of the DU is added later (as a DAY2 configuration), then the RIM M-plane manager (100) will configure the new DU.
2. The 5G DU (500a) and the 4G DU (500b) identify respective roles as part of DAY-1 configuration.
3. TLS is used as transport for the netconf session between the 5G DU (500a) and the RIM M-plane manager (100); and between the 4G DU (500b) and the RIM M-plane manager (100).
4. For RU, Performance Management, only notification mechanism will be used.
5. Both the 5G DU (500a) and the 4G DU (500b) will subscribe for fault alarms. The RIM M-plane manager (100) filters the alarms based on role of the DU and notifies accordingly.

Therefore, the proposed method allows the non-ORAN complaint radios to be deployed and effectively used without any change in the existing architecture, no extra deployment cost using the M-plane functionality to enable seamless communication between the RU (300) and the DUs (500a-b). The proposed method is DU independent and hence any DU can communicate with any RU.

Figure 4:
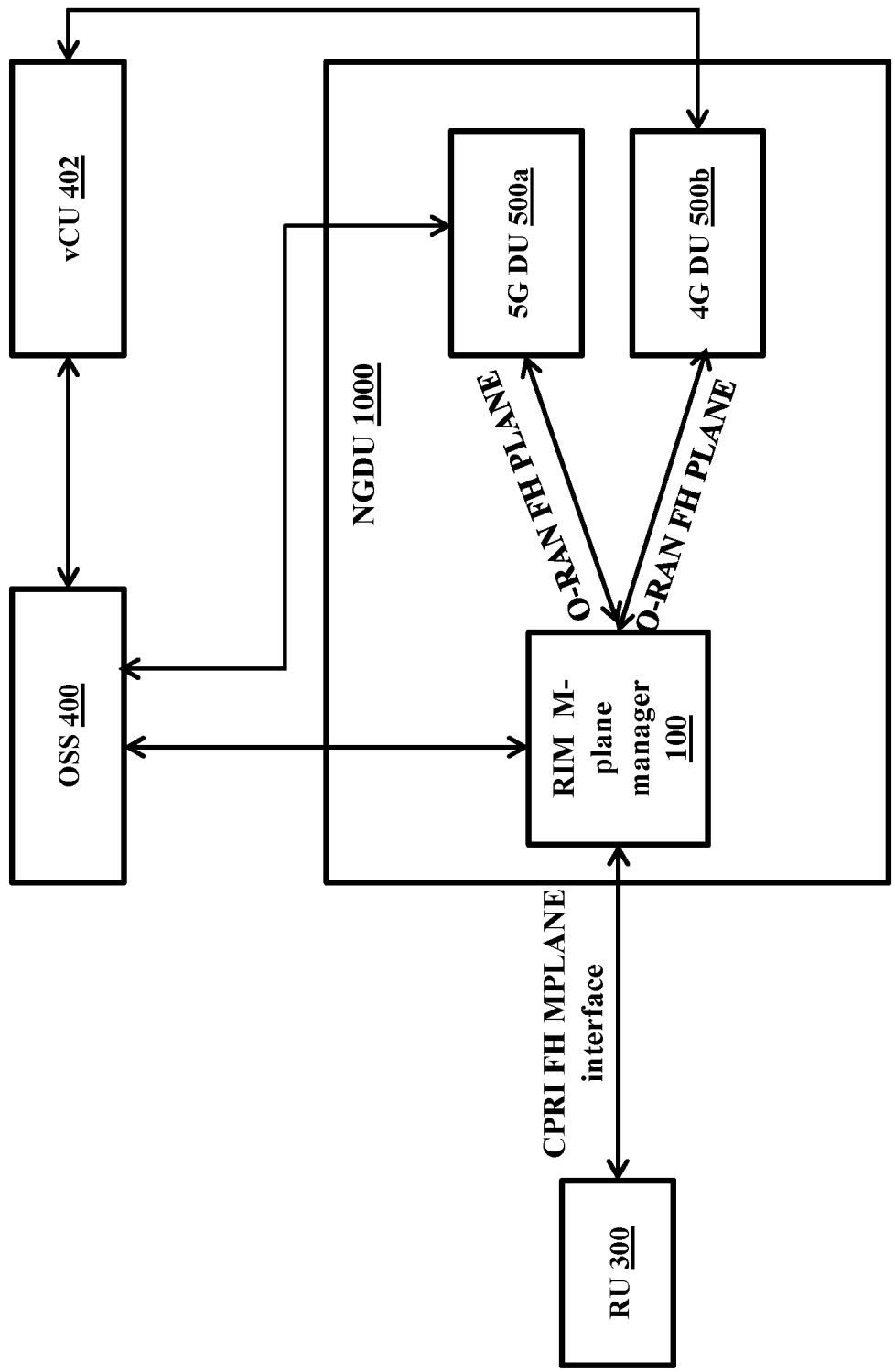
FIG. 4 illustrates an overall architecture of the NGDU for enabling communication in the NGDU of the O-RAN, according to an embodiment as disclosed herein.

FIG. 4 illustrates an overall architecture of the NGDU (1000) for enabling communication in the NGDU (1000) of the O-RAN, according to an embodiment as disclosed herein.

In general, call home procedure is useful for both the initial deployment and ongoing management of networking elements in the NGDU (100). For example, the call home procedure may be initiated when the network element may proactively "call home" after being powered on for the first time in order to register itself with its management system.

Referring to the FIG. 4, consider that the RU (300) is a 3rd Party Radio Unit which operates on CPRI front haul interface. The 5G DU (500a) establishes the Netconf session with the RIM M-plane manager (100) and 4G DU (500b) also establishes a separate Netconf session with the RIM M-plane manager (100). Here, the 4G DU (500b) is configured through vCU (402) and not directly by the OSS (400). The RIM M-plane manager (100) comprises a Radio Interface Module (RIM) runs on the NGDU (1000) which also acts as O-RU Netconf server and interface with the 4G DU (500b) and the 5G DU (500a) in the O-RAN based Netconf front haul interface. The RIM M-plane manager (100) runs multiple Netconf sessions for each RU (300a-N) that it is connected to the RIM M-plane manager (100).

The respective M plane service will start sending Column packets to the respective DU (500a or 500b). The respective DU (500a or 500b) on receiving the column packet, creates a Netconf session with the M plane service on top of the RIM M-plane manager (100). Once the Netconf session is established the M plane service will send the XML based configuration, alarms, hardware related details, etc.

The RIM M-plane manager (100) understands the JSON request. Once M-plane service receives the configuration, for example but not limited to carrier activation configuration over XML, the RIM M-plane manager (100) will extract respective fields, pass over to the RIM M-plane manager (100) over JSON request, output of the RIM M-plane manager (100) is passed to the respective DU (500a or 500b).

The advantage of the proposed method is that the multiple RUs (300a-N) with proprietary interface can directly communicate with the DUs (500a-b). In the existing methods and systems, the DU communicates with the RIM software in the absence of the O-RAN. With the O-RAN in picture inside RIM software, the M plane service is run on top of the RIM software which will create the Netconf session with the DU (500a-b).

Figure 5:
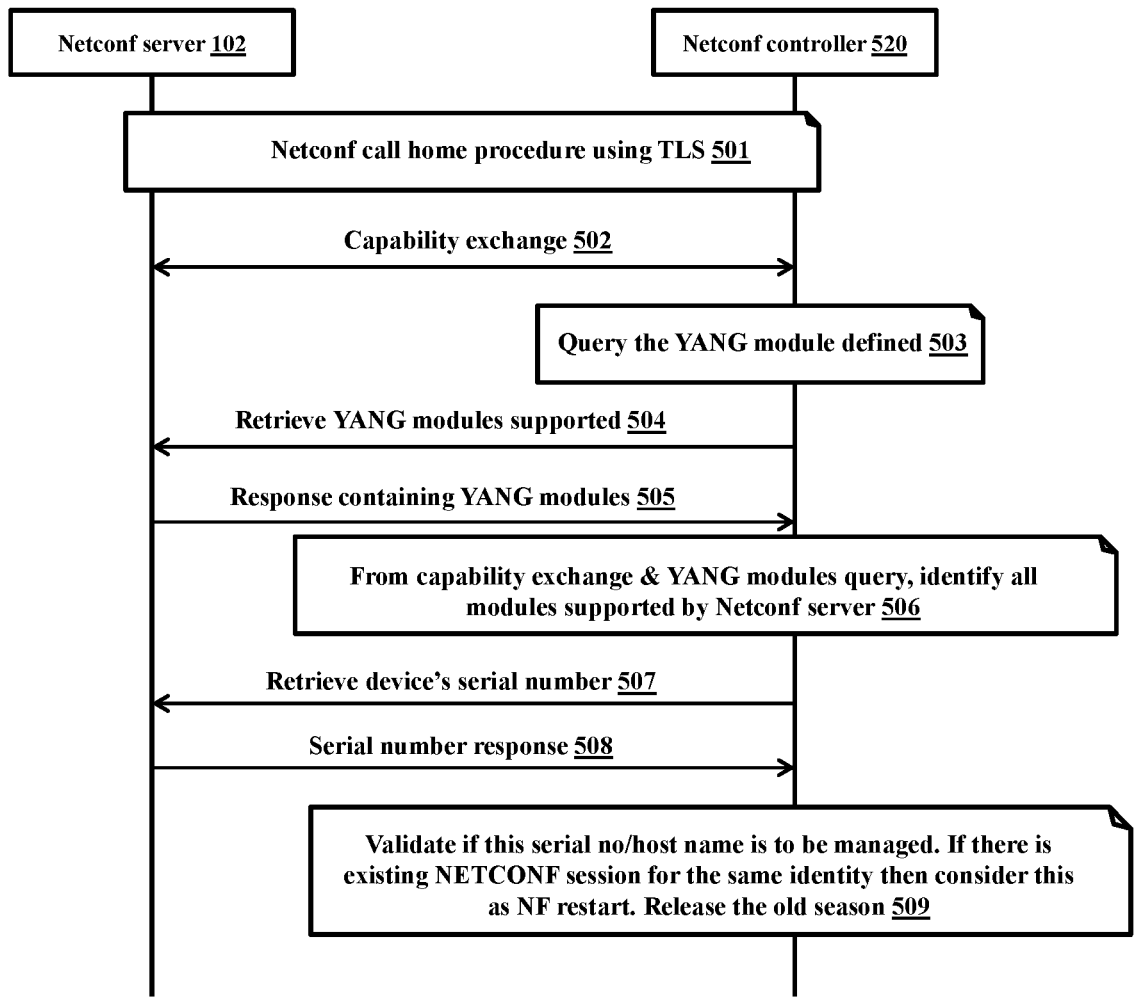
FIG. 5 is a signalling diagram for providing call home procedure in the NGDU of the O-RAN, according to an embodiment as disclosed herein.

FIG. 5 is a signalling diagram for providing call home procedure in the NGDU (1000) of the O-RAN, according to an embodiment as disclosed herein.

Referring to the FIG. 5, at step 501, Netconf call home procedure is established using TLS between the Netconf server (102) and the Netconf client (520). The TLS is used as Transport for Netconf sessions.

At step 502, the capability exchange is performed between the Netconf server (102) and the Netconf client (520).

At step 503, the Netconf client (520) queries the YANG module defined and at step 504, the Netconf client (520) indicates the Netconf server (102) to retrieve the YANG modules. Further, at step 505, the Netconf server (102) retrieves and sends a response containing the YANG modules. For O-RU specific YANG modules, the RIM M-plane manager (100) should refer ORAN-WG4.MP-YANGs-v02.00.

At step 506, the Netconf client (520) performs the capability exchange and YANG modules query, identify all modules supported by the Netconf server (102). At step 507, the Netconf client (520) indicates to the Netconf server (102) to retrieve the device's serial number from the Netconf server (102).

Further, at step 508, the Netconf server (102) retrieves and sends the serial number response to the Netconf client (520). At step 509, the Netconf server (102) validates if the serial no/host name is to be managed. If there is existing NETCONF session for the same identity then this request is considered as NF restart. Therefore, the existing NETCONF session is released.

The RIM M-plane manager (100) which includes the Netconf server (102) triggers steps 501-508 call home procedure for each RU that the NGDU (1000) is connected.

Figure 6:
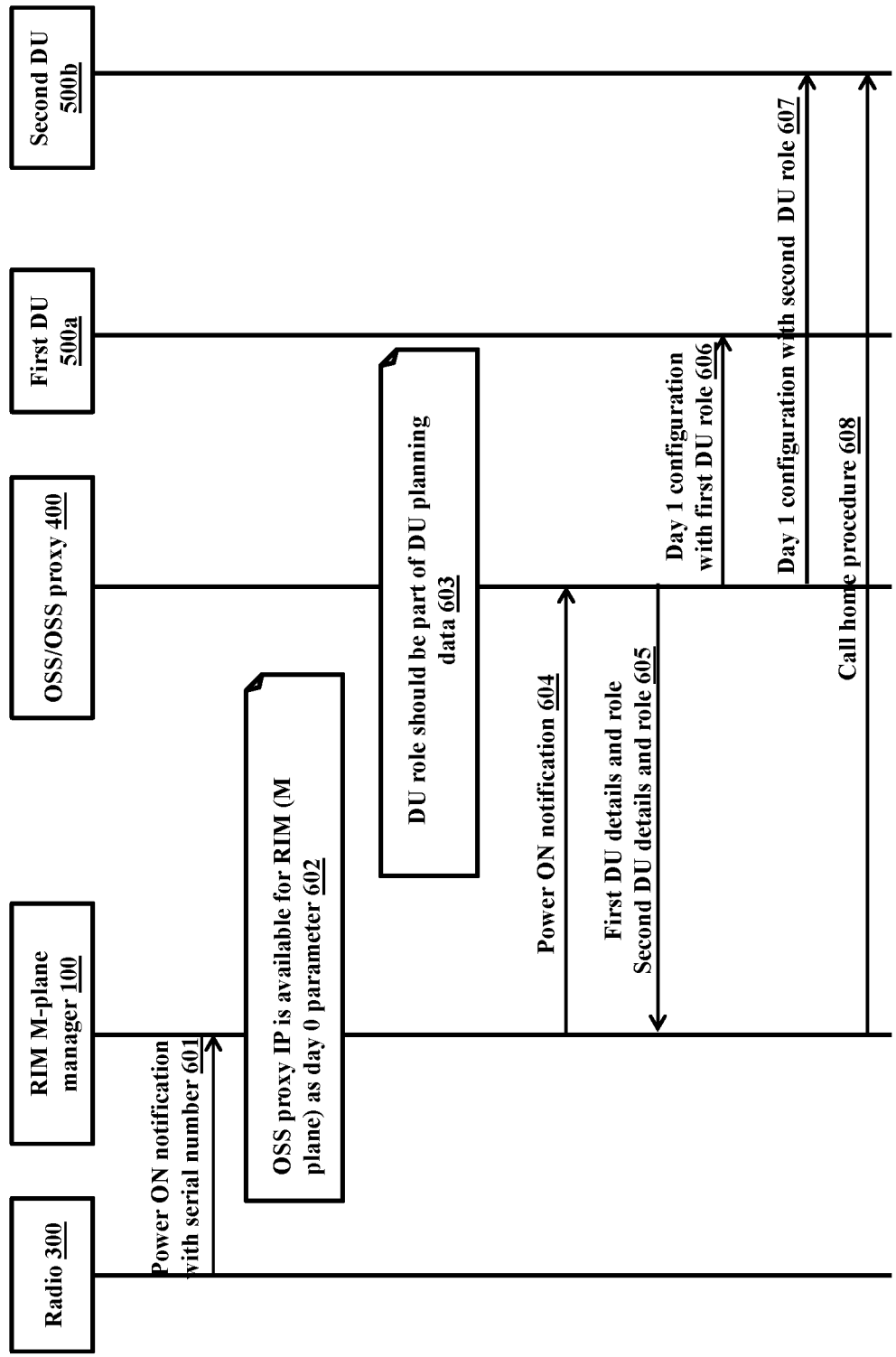
FIG. 6 is a signalling diagram for RU bring up sequence between DUs and the RIM M-plane manager for commissioning two DUs, according to an embodiment as disclosed herein.

FIG. 6 is a signalling diagram for RU bring up sequence between DUs (500a-b) and the RIM M-plane manager (100) for commissioning two DUs (500a-b), according to an embodiment as disclosed herein.

Referring to the FIG. 6, at step 601, the radio (300) sends the power ON notification with serial number to the RIM M-plane manager (100). At step 602, the OSS proxy IP is available to the RIM M-plane manager (100) as day 0 parameter and step 603, the OSS/OSS proxy (400) determines the role of the first DU (500a) and the second DU (500b) which is provided as part of the DU planning data.

At step 604, the RIM M-plane manager (100) sends the power ON notification to the OSS/OSS proxy (400).

At step 605, the OSS/OSS proxy (400) sends details and role associated with each of the first DU (500a) and the second DU (500b) to the RIM M-plane manager (100). Further, at step 606, the RIM M-plane manager (100) sends the Day 1 configuration with the role to be performed by the first DU (500a) to the first DU (500a).

At step 607, the RIM M-plane manager (100) sends the Day 1 configuration with the role to be performed by the second DU (500b) to the second DU (500b).

At step 608, the call home procedure is initiated between the RIM M-plane manager (100) and the second DU (500b) and also between the RIM M-plane manager (100) and the first DU (500a). Therefore, the RIM establishes call-home procedure for each RU (300a-N) with both the first DU (500a) and the second DU (500b).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A Next Generation Distributed Unit (NGDU) for enabling communication in an Open Radio Access Network (O-RAN), wherein the NGDU comprises:
   a radio interface module (RIM) Management Plane (M-plane) manager comprising a M-plane model;
   a plurality of DUs connected to the RIM M-plane manager over a Network Configuration Protocol (NETCONF) interface; and
   a plurality of RUs connected to the RIM M-plane manager over a non-Network Configuration Protocol (non-NETCONF) interface; wherein the RIM M-plane manager comprises a RIM M-plane controller configured to:
      receive a first communication from at least one radio unit (RU) of the plurality of RUs over the non-NETCONF interface in a front-haul network, wherein the first communication comprises a serial number associated with the at least one RU,
      send the first communication from the at least one RU to operations support systems (OSS), receive an internet protocol (IP) address associated with at least one DU for executing at least one M plane service, from the OSS, wherein the OSS receives the IP address associated with the at least one DU from one of an orchestrator and operator input, start a Netconf Callhome procedure with the at least one DU, allow the at least one DU to configure a control plane (CP) identifier at the RIM M-Plane manager, determine a non-NETCONF interface compatible version of the CP identifier configured by the at least one DU at the RIM M-Plane manager, send the non-NETCONF interface compatible version of the CP identifier to the at least one RU, and enable communication between the at least one RU and the at least one DU.

2. The NGDU as claimed in claim 1, wherein the RIM M-plane controller is configured to determine the non-NETCONF interface compatible version of the CP identifier configured by the at least one DU at the RIM M-Plane manager comprises:

input the CP identifier configured by the at least one DU at the RIM M-Plane manager to the M-plane model;

translate the CP identifier configured by the at least one DU at the RIM M-Plane manager by the M-plane model; and determine the non-NETCONF interface compatible version of the CP identifier.

3. The NGDU as claimed in claim 1, wherein the RIM M-plane controller is further configured to:

read the IP address associated with the at least one DU;

establish the at least one M plane service for each of the at least one RU using the IP address associated with the at least one DU;

perform handshakes between the at least one DU and the at least one RU;

receive at least one message from the at least one DU over the NETCONF interface, to be sent to the at least one RU;

determine a non-NETCONF interface compatible version of the at least one message; and send the non-NETCONF interface compatible version of the at least one message to the at least one RU on the non-NETCONF interface.

4. The NGDU as claimed in claim 1, wherein the RIM M-plane manager is configured with OSS proxy IP as day-0 parameter and wherein the control plane (CP) identifier is an extended Antenna-Carrier (eAxC) identifier comprising carrier identifier (ID) associated with the at least one RU and information indicating a type of DU of the at least one DU.

5. The NGDU as claimed in claim 1, wherein the RIM M-plane controller is further configured to:

maintain a heartbeat mechanism towards the at least one RU and the at least one DU;

periodically collect at least one of RU statistics and RU logs at the CP identifier configured by the at least one DU;

determine an ORAN format compatible version of the collected RU statistics;

send the ORAN format compatible version of the collected RU statistics to the at least one DU and the RU logs to a server.

6. A method for enabling communication in a Next generation distributed unit (NGDU) of an Open Radio Access Network (O-RAN), the method comprising:

receiving, by a radio interface module (RIM) Management Plane (M-plane) manager, a first communication from at least one radio unit (RU) of the plurality of RUs over a non-NETCONF interface in a front-haul network, wherein the first communication comprises a serial number associated with the at least one RU, sending, by the RIM M-plane manager, the first communication from the at least one RU to operations support systems (OSS), receiving, by the RIM M-plane manager, an internet protocol (IP) address associated with at least one DU for executing at least one M plane service, from the OSS, wherein the OSS receives the IP address associated with the at least one DU from one of an orchestrator and operator input, starting, by the RIM M-plane manager, a Netconf Callhome procedure with the at least one DU, allowing, by the RIM M-plane manager, the at least one DU to configure a control plane (CP) identifier at the RIM M-Plane manager, determining, by the RIM M-plane manager, a non-NETCONF interface compatible version of the CP identifier configured by the at least one DU at the RIM M-Plane manager, sending, by the RIM M-plane manager, the non-NETCONF interface compatible version of the CP identifier to the at least one RU, and enabling, by the RIM M-plane manager, communication between the at least one RU and the at least one DU.

7. The method as claimed in claim 6, wherein determining, by the RIM M-plane manager, the non-NETCONF interface compatible version of the CP identifier configured by the at least one DU at the RIM M-Plane manager comprises:

inputting, by the RIM M-plane manager, the CP identifier configured by the at least one DU at the RIM M-Plane manager to the M-plane model;

translating, by the RIM M-plane manager, the CP identifier configured by the at least one DU at the RIM M-Plane manager by the M-plane model; and determining, by the RIM M-plane manager, the non-NETCONF interface compatible version of the CP identifier.

8. The method as claimed in claim 6, further comprises:

reading, by the RIM M-plane manager, the IP address associated with the at least one DU;

establishing, by the RIM M-plane manager, the at least one M plane service for each of the at least one RU using the IP address associated with the at least one DU;

performing, by the RIM M-plane manager, handshakes between the at least one DU and the at least one RU;

receiving, by the RIM M-plane manager, at least one message from the at least one DU over the NETCONF interface, to be sent to the at least one RU;

determining by the RIM M-plane manager, a non-NETCONF interface compatible version of the at least one message; and sending, by the RIM M-plane manager, the non-NETCONF interface compatible version of the at least one message to the at least one RU on the non-NETCONF interface.

9. The method as claimed in claim 6, wherein the RIM M-plane manager is configured with OSS proxy IP as day-0 parameter and wherein the control plane (CP) identifier is an extended Antenna-Carrier (eAxC) identifier comprising carrier identifier (ID) associated with the at least one RU and information indicating a type of DU of the at least one DU.

10. The method as claimed in claim 6, further comprises:
    maintaining, by the RIM M-plane manager, a heartbeat mechanism towards the at least one RU and the at least one DU;
    periodically collecting, by the RIM M-plane manager, at least one of RU statistics and RU logs at the CP identifier configured by the at least one DU;
    determining, by the RIM M-plane manager, an ORAN format compatible version of the collected RU statistics;
    sending, by the RIM M-plane manager, the ORAN format compatible version of the collected RU statistics to the at least one DU and the RU logs to a server.

* * * * *